(12) United States Patent
Jakesch

(10) Patent No.: US 6,928,197 B2
(45) Date of Patent: Aug. 9, 2005

(54) METHOD FOR ASCERTAINING ERROR TYPES FOR INCORRECT READING RESULTS

(75) Inventor: Wolfgang Jakesch, Reichenau (DE)

(73) Assignee: Siemens Aktiengesellschaft, Munich ( * ) Notice: Subject to any disclaimer, the term of this patent is extended or adjusted under 35 U.S.C. 154(b) by 678 days.

(21) Appl. No.: 10/096,044

(22) Filed: Mar. 13, 2002

(65) Prior Publication Data

US 2002/0178408 A1 Nov. 28, 2002

(30) Foreign Application Priority Data

Mar. 14, 2001 (DE) .......................................... 101 12 186

(51) Int. Cl.⁷ ................................................ G06K 9/03
(52) U.S. Cl. ..................................................... 382/310
(58) Field of Search ................................ 382/176–178, 382/229–231, 309–311; 358/462

(56) References Cited

U.S. PATENT DOCUMENTS

| | | | | |
|---|---|---|---|---|
| 3,925,761 A | * | 12/1975 | Chaires et al. .............. | 704/255 |
| 4,454,610 A | * | 6/1984 | Sziklai ........................ | 382/119 |
| 4,654,875 A | * | 3/1987 | Srihari et al. ................ | 382/229 |
| 5,062,047 A | * | 10/1991 | Tanaka et al. ................. | 704/3 |
| 5,315,668 A | * | 5/1994 | O'Hair ........................ | 382/159 |
| 5,923,792 A | * | 7/1999 | Shyu et al. ................. | 382/309 |
| 6,014,460 A | * | 1/2000 | Fukushima et al. ......... | 382/177 |
| 6,400,845 B1 | * | 6/2002 | Volino ........................ | 382/176 |

* cited by examiner

*Primary Examiner*—Jose L. Couso
(74) *Attorney, Agent, or Firm*—Jacob Eisenberg; Siemens AG

(57) ABSTRACT

The invention relates to a method for ascertaining error types for incorrect reading results from an OCR reader for text units which have a standard content structure and are subdivided into distinguishable sections, using true reference data. Reference data for the respective incorrectly read text unit are used for automatically ascertaining the respective text unit with the associated sections in a dictionary for the text units which contains a text unit, subdivided into individual, distinct sections, for each searchable entry. The reading result data are used to search the dictionary for a text unit with associated sections. The sections found with the respective corresponding reference sections are then compared pair by pair and the respective incorrect reading result is classified into stipulated error classes on the basis of the discrepancies ascertained in the pair by pair comparison.

8 Claims, 2 Drawing Sheets

METHOD FOR ASCERTAINING ERROR TYPES FOR INCORRECT READING RESULTS

Figure 1:
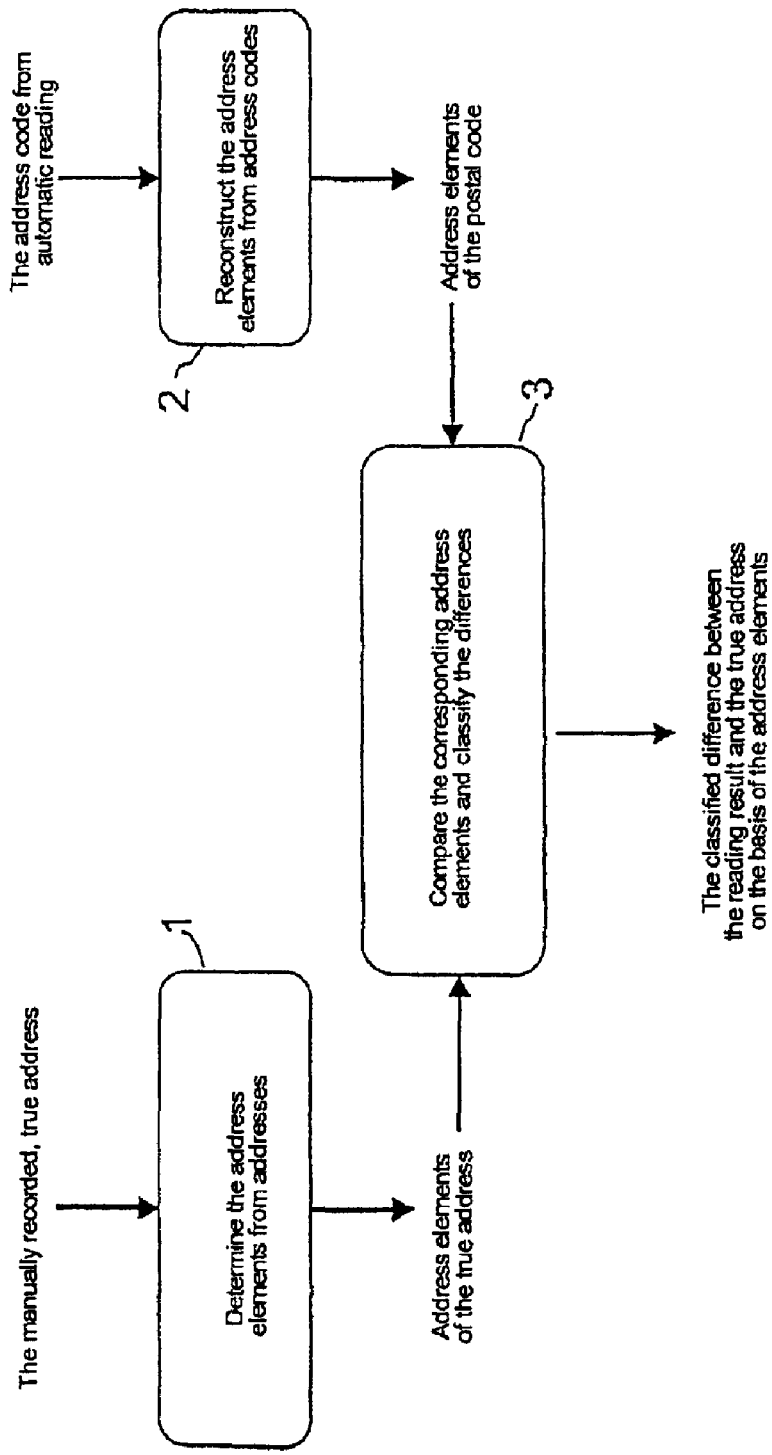

The invention relates to a method for ascertaining error types for incorrect reading results from an OCR reader for text units which have a standard content structure and are subdivided into distinguishable sections, with each text unit which is to be read producing reference data. The text units comprise alphanumeric characters; these may be form entries or dispatch addresses, for example.

Automatic address reading for dispatches is a technology for sorting and distributing the dispatches which is used throughout the world. In this case, the addresses on the dispatches comprise a postal code, town details, street names, house numbers, possibly apartment numbers and names, and any other identifying details. The postal code comprises either digits (ZIP code in the US, postcode in Germany) and describes the town, or a mixture of digits and letters and describes the address down to the street.

The automatic reading operation in an OCR reader involves reading the characters and then the individual elements of the address. This is followed by matching to the entries in an address dictionary, and the address dictionary is used to ascertain an address code (postal code and other code characters entered in the address database) which describes the address down to house numbers in a street. If the postal code describes the address down to the street, the reading in the OCR unit involves matching the postal code data read and the city and street names read and also house numbers to determine validity.

This technology is not perfect, however. In many cases, the distribution information ascertained during automatic reading does not match the distribution information on the postal dispatch. In order to check the reading quality of an OCR reader and to obtain accounts of the error types and frequencies, the addresses have been input manually from random samples as a reference, and the address code has been ascertained therefrom using an address dictionary. For each address, the address code from the manually input address has then been automatically compared with the address code produced from the automatic reading process. Although this comparison between the address code ascertained from the manually input address and the address code produced from the automatic reading process has been able to identify reading errors, it has not been possible to determine the causes thereof.

For this reason, the individual processing steps in the OCR reader have to date been examined manually and interactively to determine whether or not the reading error was caused in this respective processing step. This operation is very time-consuming and susceptible to error, and can therefore be carried out only for a few reading errors. The analysis restrains the experts associated with the module currently being examined and cannot be run independently of the reader.

The invention presented in claim 1 is therefore based on the object of providing a generic method which is used to perform error analysis for ascertaining the error types which is faster and less complex as compared with the prior art.

The use of a structured, searchable dictionary for the text units with distinct sections, the automatic conversion of the true reference data into a text unit with the associated, distinct sections using the dictionary, the automatic search in the dictionary for a text unit with the sections using the reading result data, i.e. the reconstruction of the structured text unit, the comparison of the corresponding sections and the ascertainment of the error classes allow very fast automatic error analysis without any complex involvement of specialists.

Advantageous refinements of the invention are presented in the subclaims.

It is advantageous for the error types to be ascertained from a random reading sample.

If the error analysis is intended to be used for subsequently changing the parameters of the OCR reader in order to improve the reading rate, then it is advantageous for the error classes ascertained to be evaluated on a statistical basis. This is the only way of providing useful analysis results for a reading change.

It is also advantageous to use the invention for reading addresses, in particular dispatch addresses. These dispatch addresses are advantageously identified by address codes which are also contained in the address dictionary.

To ascertain the incorrect reading results, it is advantageous for the address codes produced from the manual input and from the reading process to be compared with one another.

It is also advantageous to use the address code produced in the reading process in order to search the address dictionary for the appropriate address entry and hence in order to ascertain the parts of the address.

The true reference data are advantageously produced by manual input.

Figure 2:
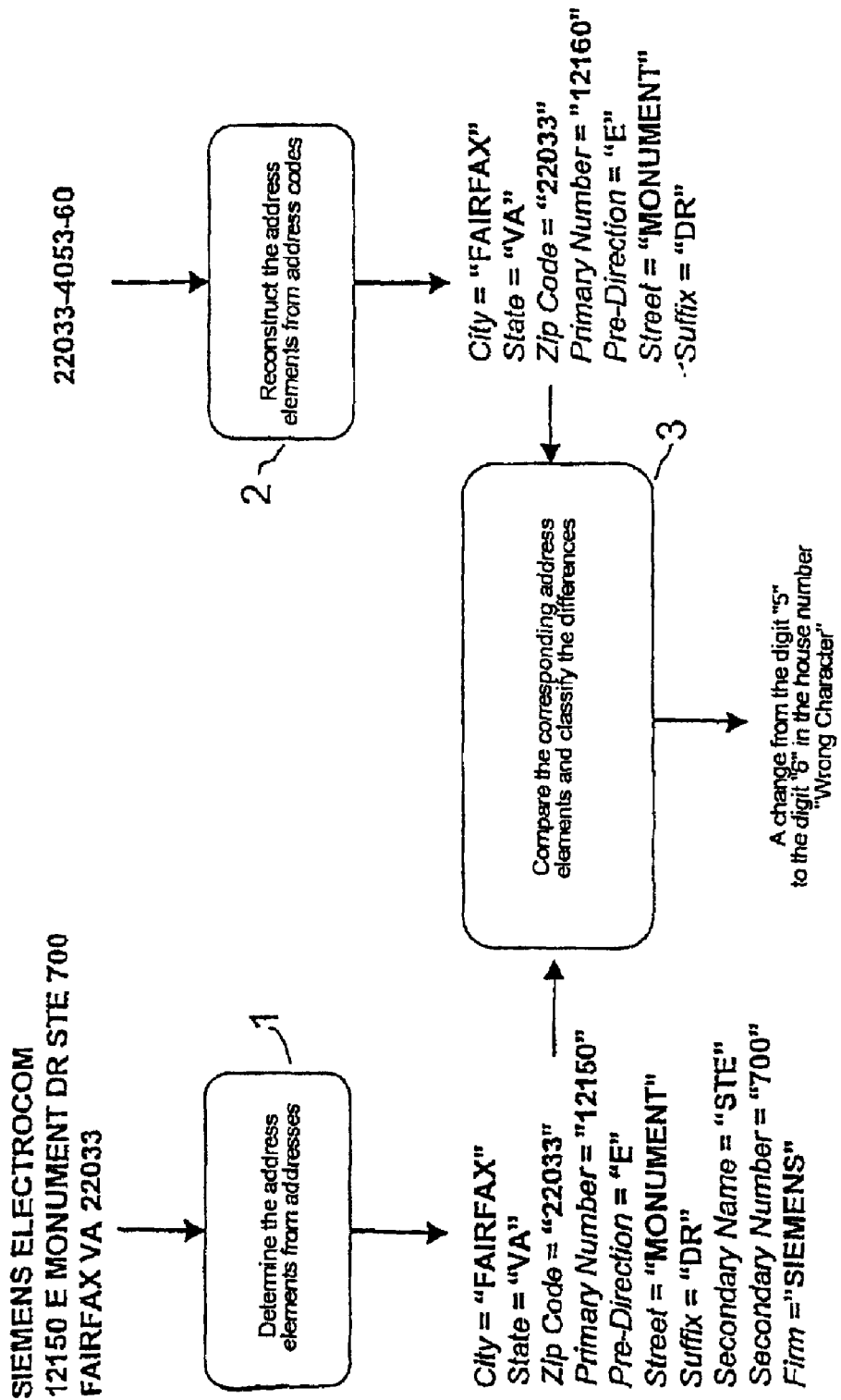

The invention is explained in more detail below in an exemplary embodiment with reference to the drawing, in which FIG. 1 shows a flowchart relating to the method sequence for addresses which are to be read, FIG. 2 shows a flowchart for a specific US address.

The exemplary embodiment describes the method sequence for reading a US address.

The reading task is to read the following addresses as a text unit:

SIEMENS ELECTROCOM

12150 E MONUMENT DR STE 700

FAIRFAX Va. 22033

In this regard, the OCR reader ascertains the following address code:

22033-4053-60

When the true address has been input manually, an address dictionary is used to determine the valid address codes in order to establish whether this address has been read incorrectly. Specifically, if the address code ascertained by the OCR reader does not match one of the valid address codes, there has been a reading error.

The addresses often have a plurality of valid address codes since their different descriptive stages (e.g. with or without house number, with or without indication of street) have different, but valid, address codes.

The address indicated has the following valid address codes ascertained on the basis of the manual input:

22033-4064-75, 22033-4064, 22033-4053-50, 22033-4053, 22033 and 220330.

Hence, an error has been identified, but the cause is still unknown.

When a search through the address dictionary has revealed the corresponding entry with the address code, the individual address elements (text sections) are determined on the basis of the entries 1. This has resulted in the following address elements:

City="FAIRFAX", State="VA", Zip Code="22033"
Primary="12150", Pre-Direction="E", Street=

"MONUMENT" Suffix="DR", Secondary-"STE 700", Firm="SIEMENS ELECTROCOM"

The address code ascertained by the OCR reader is likewise used to search the address dictionary for a corresponding entry with address elements. This therefore reconstructs the address elements from the address code from the OCR reader 2. The address code 22033-4053-60 has the following address elements entered for it:

City="FAIRFAX", State="VA", Zip Code="22033"Primary="12160", Pre-Direction="E", Street="MONUMENT", Suffix="DR"

Next, these address elements are compared pair by pair 3:

First, those address elements which are identical and those which are not are established. The address elements Primary, Secondary and Firm are not identical. The address element Primary differs by one character. The reader has replaced a "5" with a "6". The address elements Secondary and Firm have not been filled in by the reader. The error is therefore that the digit "5" has been replaced with the digit "6" in the house number.

In this US application, the following error classes are used:

| | |
|---|---|
| Read5 Error: | The 5-digit result is incorrect. |
| Read9 Error: | The 9-digit result is incorrect. |
| Unique Error: | The ZIP code is unique. |
| Wrong State: | The 11-digit result belongs to a different state. |
| Wrong City: | The 11-digit result belongs to a different city. |
| Missing Street: | The street name is missing in the required data. |
| Box versus Street: | The PO BOX/STREET addresses have been combined. |
| Wrong Street Name: | The 11-digit result belongs to a different street. |
| Wrong Direction: | The 11-digit result has a different direction. |
| Wrong Suffix: | The 11-digit result has a different suffix than the required data. |
| Missing Primary: | The house number is missing in the required data. |
| Primary Length: | The house number in the 11-digit result is of a different length. |
| Wrong Character: | The house number in the 11-digit result has 1 incorrect character. |
| Wrong Primary: | The 11-digit result belongs to a different house number. |
| Missing Secondary: | The secondary is missing in the required data. |
| Wrong Secondary: | The 11-digit result belongs to a different secondary. |
| Missing Firm: | The firm is missing in the required data. |
| Wrong Firm: | The 11-digit result belongs to a different firm. |
| Reconstruction: | The address elements could not be reconstructed. |
| Unknown Error: | The address elements are identical on a pair by pair basis. |

This means that the "Wrong Character" error class is applicable and hence there is an error in the recognition of individual characters.

What is claimed is:

1. A method for ascertaining error types for incorrect reading results from an OCR reader for text units which have a standard content structure and are subdivided into distinguishable sections, using true reference data, characterized in that the reference data for the respective incorrectly read text unit are used for automatically ascertaining the respective text unit with the associated sections in a dictionary for the text units which contains a text unit, subdivided into individual, distinct sections, for each searchable entry, in that the reading result data are used to search the dictionary for a text unit with associated sections, the sections found with the respective corresponding reference sections are compared pair by pair, and in that the respective incorrect reading result is classified into stipulated error classes on the basis of the discrepancies ascertained in the pair by pair comparison.

2. The method as claimed in claim 1, characterized in that the error types are ascertained from a random reading sample.

3. The method as claimed in claim 1, characterized in that the error classes ascertained are evaluated on a statistical basis.

4. The method as claimed in claim 1, characterized in that the text units are addresses.

5. The method as claimed in claim 4, characterized in that each entry in the address dictionary contains an address code.

6. The method as claimed in claim 5, characterized in that the automatic reading involves production of an address code which is compared with an address code produced from the manual input data, with a reading error being diagnosed if there is no match.

7. The method as claimed in claim 5, characterized in that the address code as reading result data is used to search the address dictionary for an address with the various address elements as sections of the text unit for comparison with the address elements from the manual input.

8. The method as claimed in claim 1, characterized in that the true reference data for each text unit which is to be read are produced by manual input.

* * * * *